United States Patent [19]

Johanning

[11] Patent Number: 4,583,883
[45] Date of Patent: Apr. 22, 1986

[54] PNEUMATIC CONVEYOR FOR GRAIN

[75] Inventor: Hermann Johanning, Melle, Fed. Rep. of Germany

[73] Assignee: Engelbrecht & Lemmerbrock GmbH & Co., Melle, Fed. Rep. of Germany

[21] Appl. No.: 610,826

[22] Filed: May 15, 1984

[30] Foreign Application Priority Data

May 17, 1983 [DE] Fed. Rep. of Germany ....... 3317887
Mar. 8, 1984 [DE] Fed. Rep. of Germany ....... 3408442

[51] Int. Cl.⁴ ............................................ B65G 53/40
[52] U.S. Cl. ........................................ 406/65; 406/90; 406/142
[58] Field of Search ....................... 406/61, 65, 88, 90, 406/93, 94, 141, 142, 143

[56] References Cited

U.S. PATENT DOCUMENTS

| 2,793,914 | 5/1957 | Gardeniers et al. | 406/65 X |
| 2,827,333 | 3/1958 | Wallin | 406/65 X |

FOREIGN PATENT DOCUMENTS

| 2388739 | 12/1978 | France | 406/61 |
| 206361 | 11/1959 | German Democratic Rep. | 406/93 |
| 590312 | 4/1959 | Italy | 406/90 |
| 664895 | 5/1979 | U.S.S.R. | 406/90 |

Primary Examiner—Jeffrey V. Nase
Attorney, Agent, or Firm—Balogh, Osann, Kramer, Dvorak, Genova & Traub

[57] ABSTRACT

The pneumatic conveyor for grain consists of a horizontal conveying space, which accepts the falling grain at one end and whose discharge end terminates in an upward-narrowing vertical conveyor tube adjacent to the horizontal conveyor line, the grain being conveyed on a flow tray by a bypass flow or mechanically into the lower part of the vertical tube.

5 Claims, 7 Drawing Figures

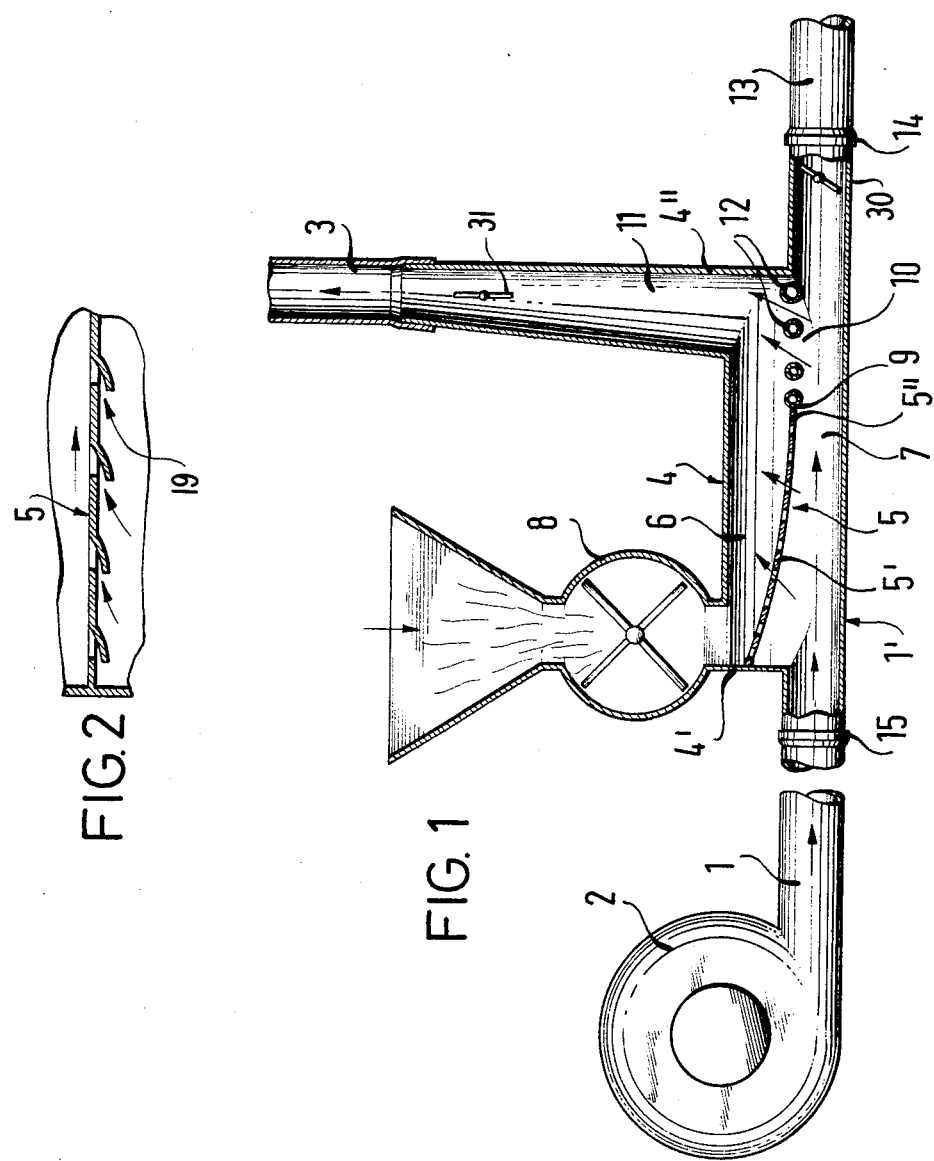

PNEUMATIC CONVEYOR FOR GRAIN

FIELD OF THE INVENTION

The invention relates to a pneumatic conveyor for grain, a metered supply of grain being passed into a horizontal conveyor line of the conveyor, which line leads into a vertical conveyor tube.

DESCRIPTION OF THE PRIOR ART

In the case of conventional vertical pneumatic conveying devices for grain, for example for filling a tower silo, the grain is fed via a bucket wheel or through suction nozzles, it is necessary to connect a horizontal conveyor line via a 90° deflector in order to convey the grain vertically upwards into an upright conveyor tube. When grain is being conveyed by means of conveying air such deflectors possess an extremely high flow resistance, and thus this method of conveying requires a correspondingly high fan output.

OBJECTS AND SUMMARY OF THE INVENTION

An object of the invention is to avoid the high flow resistance of 90° deflectors in pneumatic conveying installations with vertical conveyor tubes.

It is also an object to keep the structural height of the conveying apparatus as low as possible.

This object is achieved, in the case of a pneumatic conveyor of the type mentioned, by the provision of a horizontal conveying space which receives the falling grain and whose discharge end leads into an upward-narrowing vertical conveyor tube adjoining the horizontal conveyor line.

This solution enables 90° deflectors with high flow resistances to be avoided, as only the conveying air is now deflected from the horizontal into the vertical direction. At this point of deflection of the conveying air, the grain from the conveying space is suspended in the air and passed to the vertical conveying air flow, is taken up by this conveying air and is only subsequently entrained upwards in a rapid flow in the narrowed, vertical conveyor tube by the air speed which increases therein.

According to an embodiment of the invention, grain which is metered into the conveying space is fed, on a flow tray and suspended in the air, to the lower part of the vertical conveyor tube by a conveying air bypass which passes upwards through the flow tray, or this feeding can be effected mechanically from the conveying space by a screw conveyor, a conveyor belt or the like.

In order to enable the structural height of the conveying space to be kept low, the flow tray of the conveying space forms the upper wall of the horizontal conveyor line for a desired length immediately upstream of the vertical conveyor tube.

It is possible to reduce the structural height of the apparatus even further, in order for example to enable harvested grain to be discharged from dumper trucks into a filling hopper set on the bucket wheel without special tubes or the like laid at a lower level being necessary. The procedure here is that the horizontal conveyor line is provided at one point in its upper cross-section with a baffle, upstream of which the conveyor line is provided with a lateral, chamber-shaped bypass which terminates below a flow tray of a conveying space lying approximately perpendicular to the conveyor line and having a bucket-wheel feed at the top, the height of the conveying space with the flow tray being in the vertical zone of the lower half of the cross-section of the horizontal conveyor line and leading, downstream of the baffle, into the lower part of the upright conveyor tube.

It is advantageous to design a length of the horizontal conveyor line with the bypass, the conveying space interacting with a bucket-wheel feed and the lower part of the vertical conveyor tube as a unit, which can at any time be incorporated into the conveyor line.

A pneumatic conveyor according to the invention can be operated with a compressed-air or suction-air fan, a centrifugal separator for the grain being incorporated, in suction-air operation, in the vertical conveyor tube above a silo or store, and the suction fan then being connected to the exit-air pipe of this separator.

BRIEF DESCRIPTION OF THE DRAWINGS

In the course of the following detailed description reference will be made by way of example with reference to the accompanying partly diagrammatic drawings, in which:

FIG. 1 is a schematic side view of one embodiment of pneumatic conveyor according to the invention, FIG. 2 is a schematic view of a flow tray forming part of the conveyor of FIG. 1.

DETAILED DESCRIPTION OF PREFERRED EMBODIMENTS

Figure 3:
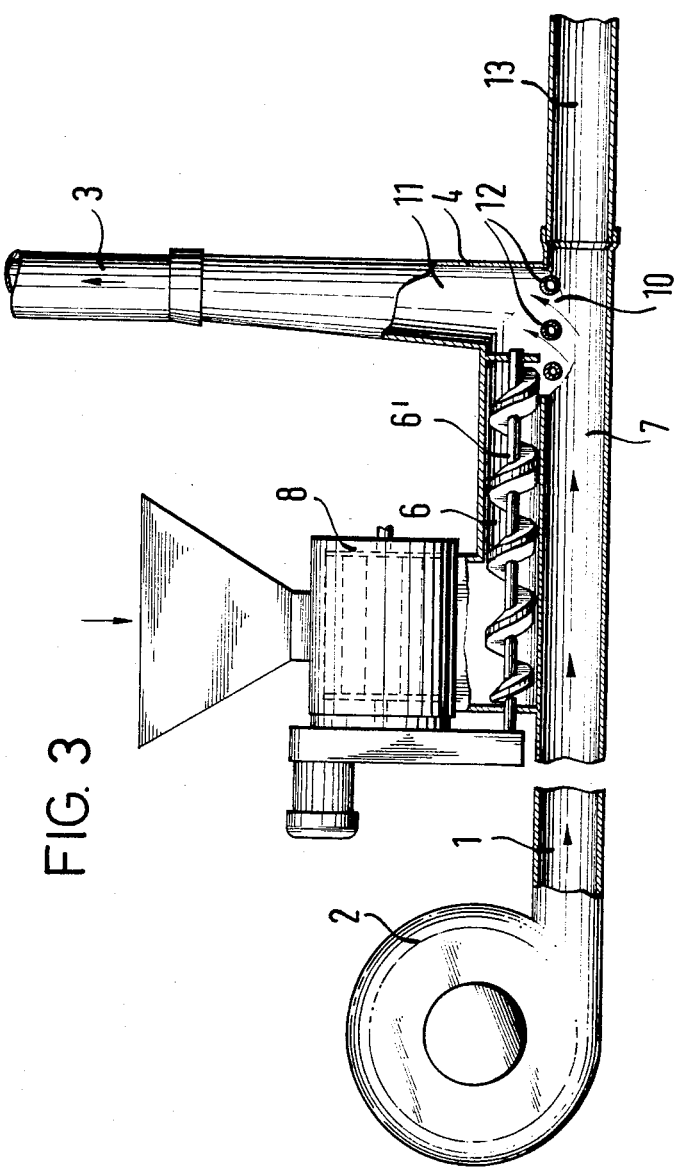
FIG. 3 is a schematic view of another embodiment of pneumatic conveyor according to the invention and incorporates a mechanical conveyor.
Figure 5:
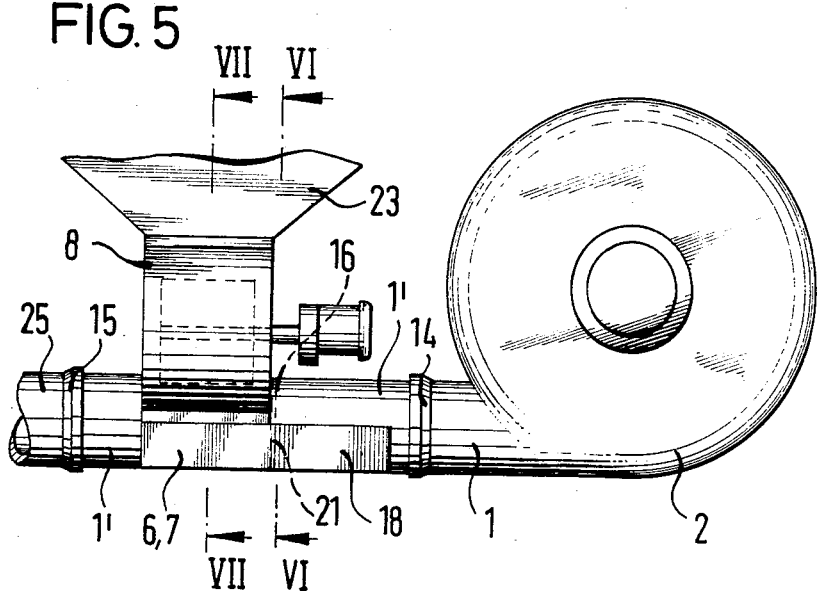
FIG. 5 is a side view of the apparatus of FIG. 4.
Figure 4:
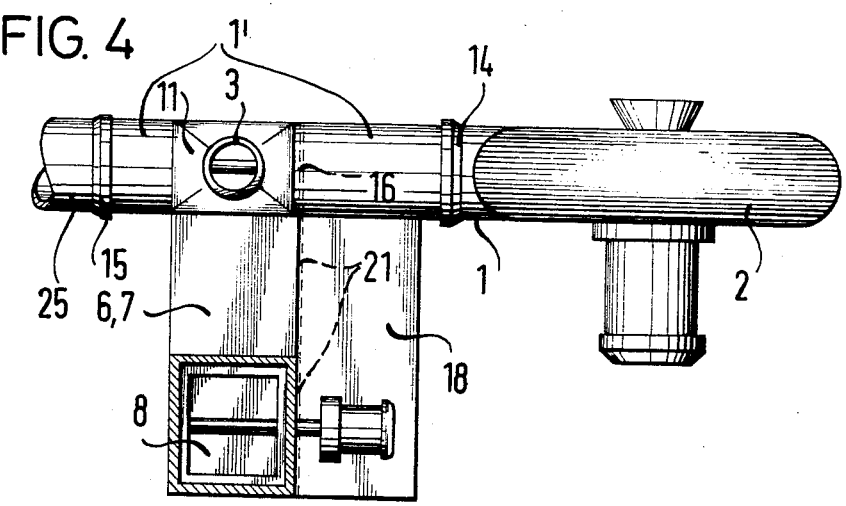
FIG. 4 is a plan view of conveying apparatus according to the invention viewed from the line 1—1 of FIG. 7 and incorporating a lateral chamber like bypass for reducing the overall height of the apparatus.
Figure 7:
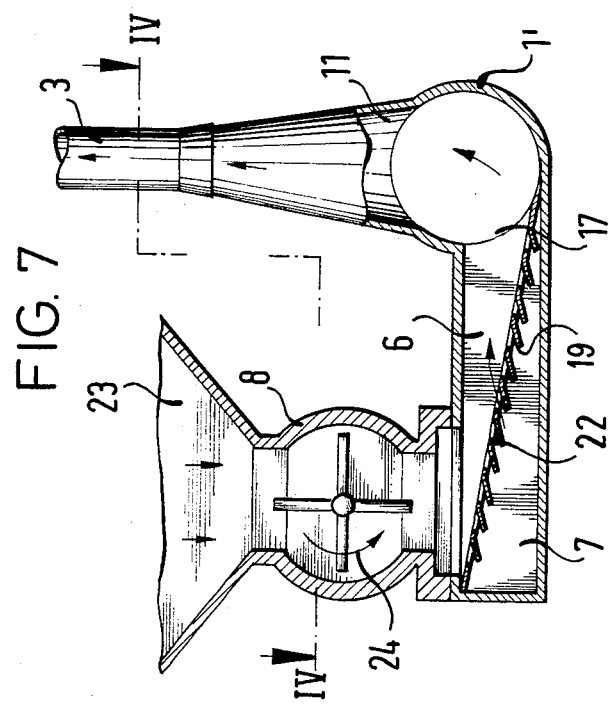
FIG. 7 is a cross-sectional view taken on line IV—IV of FIG. 5.
Figure 6:
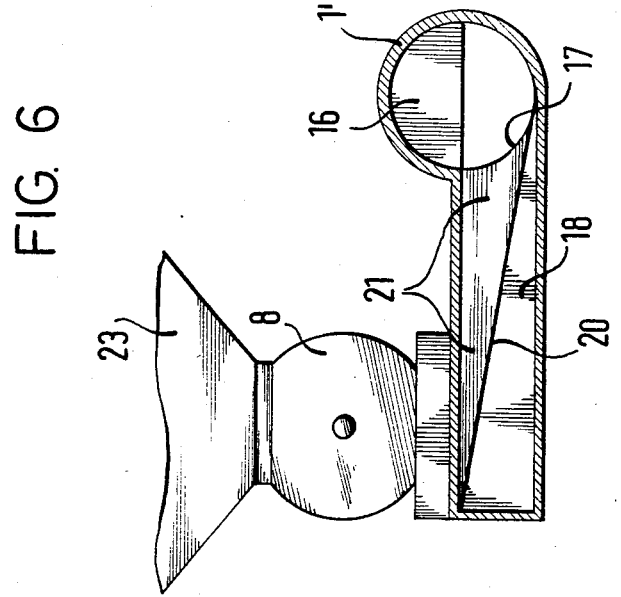
FIG. 6 is a cross-sectional view taken on line III—III of FIG. 5.

According to the embodiment shown in FIGS. 1 and 2, a pressure line 1 is supplied with conveying compressed air by a fan 2, the speed of this air enabling it to convey grain upwards in a vertical conveyor pipe 3.

The pressure line 1 terminates in a lower space of a container 4, this space being matched to the cross-section of the pressure line. This container 4 is sub-divided into an upper space 6 and a lower space 7 by a flow tray 5 which in practice forms the upper wall of a length of line 1'. The flow tray 5 can, for example, be designed as is shown in partial longitudinal section in FIG. 2, or can alternatively be designed as a sheet with lengthwise slits whose width does not permit falling grain to pass through from chamber 6. One part of the flow tray 5, beneath the immediate discharge of a bucket wheel 8 which can be charged with grain from a store and can be driven to rotate, is advantageously inclined downwards, as at 5', starting from an end wall 4' and then leads into a horizontal part 5", which ends at such a distance from a terminal end wall 4" that a free upward passage 10 is formed between an end edge 9 of the flow tray 5 and the terminal end wall 4", the cross-section of this passage corresponding to the cross-section of the lower container space 7. Above this passage 10, an upright, widened exit 11 adjoins the housing 4 and leads in an upwardly narrowing manner into a narrowed upward conveyor tube 3. As a result of the narrowed cross-section of the tube 3 the conveying air speed necessary for the vertical conveying of the grain is achieved. In order to obtain favourable deflection of the conveying air upwards out of the lower container space 7 through the passage 10, structural elements such as pipes 12, rods, guide plates or the like may be installed in the passage 10 parallel to the edge 9 of the flow tray.

The grain falls directly from the bucket wheel 8 onto the inclined part 5' of the flow tray 5, and is entrained on the flow tray by a part of the conveying air which passes upwards from the lower conveyor line 7 through the flow tray 5, so that the grain flows slowly to the end edge 9. At this end edge it is picked up in the passage 10 by the conveying air flowing upwards from the lower conveyor line 7 and is first entrained slowly upwards, in suspension, through the widened portion 11 and by the conveying air whose speed is low in this portion, and is then carried upwards over the desired conveying height by the increasing speed in the narrowed, upright conveyor pipe run 3.

As a result of the slow flow of the grain on the flow tray 5 and the reduced conveying air speed above the passage 10, which however does permit the grain to be suspended and entrained by the conveying air upwards into the connection 11, abrupt deflection of the grain is avoided, but the necessary speed for the upward conveying is achieved by the narrowing of the upright conveyor tube 3.

A horizontal conveyor line 13, capable of being shut off, can also be connected to the container 4, the part 5'' of the flow tray 5 then being pivotable upwards about the end edge 9 to shut off the upper container space 6, so that at the end of the inclined flow tray part 5' the grain falls into the conveying air stream of the lower conveyor line 7, and is entrained and fed to the horizontal, narrowed conveyor tube 13. In this case the conveyor tube 3 must then be sealed, while in the case of vertical conveying the line 13 must be sealed.

As mentioned in the introduction, the slow conveying flow in the upper conveying space 6 can also be effected mechanically by means of a conveyor belt, a screw conveyor or the like, as is shown for example in FIG. 3, in which equivalent parts to FIG. 1 are given the same reference figures. In this case, where the method of operation is the same as described for FIGS. 1 and 2, a screw conveyor 6' rotating at a slow speed is situated in the upper space 6, advantageously designed as a pipe, and conveys the grain, falling from the supply 8, in a slow stream to the passage 10 through which the conveying air flows upwards from the lower conveyor air line 7 which is parallel to the conveying space 6 and prolongs the conveyor tube 1. The air flow speed is reduced in passage from line 7 through space 10 to space 11. The same events then take place as described with reference to FIG. 1. As shown in FIG. 1, a shut-off means 30 adjacent the conveyor line 30 and a shut-off means 31 is disposed in the conveyor tube 3.

In both cases shown in FIGS. 1 and 3, the cross-sections of the lower space 7, the passage 10 and the upright narrowed conveyor pipe 3 are selected to be of substantially equal size. It is also possible to work with a suction fan instead of a pressure fan, the procedure in this case being that the conveyor line 1 forms the inlet for the conveying air and the vertical conveyor line 3 terminates in a centrifugal separator to which is connected a suction line leading to a suction fan.

As already mentioned, the structural height of the conveying apparatus can be still further reduced relative to the embodiment shown in FIGS. 1 to 3 by the embodiment shown in FIGS. 4 to 7.

In FIGS. 4 to 7, the same reference figures are used for identical parts from FIGS. 1 to 3. In accordance with this example, a pressure line 1 is again connected to a pressure fan 2. A unit can be inserted into this pressure line between the separation points 14 and 15, extending over a length 1' of the pressure line 1. The length 1' of the pressure line is provided with a baffle 16 which covers the upper cross-section of the line and hence constricts the cross-section of the length 1'. Upstream and downstream of this baffle 16, the length 1' is provided in its lower part with a lateral aperture 17 between the baffle 16 and the floor of the line 1'. Upstream of the baffle 16 a back-up chamber 18 laterally adjoins this aperture 17, and a back-up pressure is created in this back-up chamber 18 by the baffle 16. A conveying space 6,7 of the same height is connected to this back-up chamber 18 in the direction of the conveyor line 1' and terminates downstream of the baffle 16, via the aperture 17, in the lower part of the conveyor line 1'. The connection between the two chambers 18 and 6,7 is partly blocked due to the fact that an approximately triangular blocking wall 21 is installed above a straight or curved incline 20 extending at an angle from outside to the floor of the conveyor line 1', the two chambers 18 and 6,7 being connected below this blocking wall.

A perforated flow-plate 22 extending at an angle from outside to the floor of the conveyor line 1a is installed in the conveying chamber 6, in the plane of the incline 20 of the chamber 18, and terminates in the lower part of the conveyor line 1' which is open laterally at the bottom in the region of the chamber 6. Above the outer end of the flow-plate 22 the chamber 6,7 is directly connected to the discharge of a bucket wheel 8 having an upper feed hopper 23.

In operation, the back-up pressure generated in the chamber 18 by the baffle 16 acts on the space 7 below the flow-plate 22 in such a way that the falling grain fed in via the bucket wheel 8 is conveyed, on the inclined flow-plate and suspended as a result of the back-up pressure, towards the conveyor line 1a downstream of the baffle 16. The bypass conveying is effected by the pressure difference in the air flow upstream and downstream of the baffle 16, and is further supported by the fact that the direction of rotation 24 (FIG. 7) of the bucket wheel 8 delivers the grain towards the pressure line 1'.

The flow tray 22 terminates in the pressure line 1' at the point where the upward-narrowing connecting pipe 11 of the vertical conveyor tube 3 adjoins, so that the suspended grain is here picked up by the conveying air stream and entrained upwards.

The entire unit described can be removed from the vertical conveyor tube 3 by loosening the connectors 14,15 and the pipe 11, and can be installed by the reverse procedure. In this case again, the upright conveyor tube 11,3 can be shut off, and a horizontal or inclined conveyor line 25 can be connected instead of the length of line 1a which is closed at 15. A suction fan can also be used in the embodiment according to FIGS. 4 to 7, in which case a bucket-wheel feed may be dispensed with.

It will be understood that the embodiments of the invention described above are exemplary and that changes may be made without departing from the scope of the invention claimed.

I claim:

1. A pneumatic conveyor for grain having a metered supply of grain passing into a horizontal container coupled between a pressure line and a vertical conveyor tube, comprising a container defining a horizontal conveying space, said conveying space adapted to receive grain falling from a bucket wheel, said horizontal conveying space having a discharge end, said vertical conveyor having an upwardly-narrowing portion, means coupling the discharge end to said upwardly-narrowing portion, a baffle being disposed in an upper cross-section of said horizontal container, a lateral, chamber-shaped bypass, said bypass being located upstream of said pressure line, a flow tray disposed in said conveying space, said bypass lying approximately perpendicular to said horizontal container, said bucket wheel having a discharge end above said flow tray, said pressure line defining an air feed connected to said horizontal conveying space adjacent said discharge end and directing an air stream below said flow tray.

2. Pneumatic conveyor according to claim 1, wherein the bypass of the horizontal conveying space is formed as a lateral chamber, which is connected below the flow-plate with the conveying space which is also formed as a lateral chamber.

3. Pneumatic conveyor according to claim 2, wherein the pressure line with the baffle together with the two lateral chambers, bucket wheel and inlet hopper and together with a connection to the vertical conveyor tube can be inserted or removed as a unit into or from the conveying space.

4. Pneumatic conveyor according to claim 3, wherein the unit is provided with a pipe connection lying in the direction of the horizontal pressure line and that this pipe connection or the vertical conveyor tube are provided with shut off means.

5. Pneumatic conveyor according to claim 1, wherein the bucket wheel rotates in one direction, as a result of which the grain emerging from the bucket wheel is directed, together with the flow tray, to the horizontal conveying space.

* * * * *